(12) United States Patent
Wang et al.

(10) Patent No.: US 10,614,343 B2
(45) Date of Patent: Apr. 7, 2020

(54) PATTERN RECOGNITION APPARATUS, METHOD, AND PROGRAM USING DOMAIN ADAPTATION

(71) Applicant: NEC Corporation, Tokyo (JP)

(72) Inventors: Qiongqiong Wang, Tokyo (JP); Takafumi Koshinaka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 183 days.

(21) Appl. No.: 15/759,302

(22) PCT Filed: Sep. 16, 2015

(86) PCT No.: PCT/JP2015/004716
§ 371 (c)(1),
(2) Date: Mar. 12, 2018

(87) PCT Pub. No.: WO2017/046828
PCT Pub. Date: Mar. 23, 2017

(65) Prior Publication Data
US 2018/0253628 A1 Sep. 6, 2018

(51) Int. Cl.
*G06K 9/62* (2006.01)
*G10L 17/02* (2013.01)
*G10L 17/04* (2013.01)

(52) U.S. Cl.
CPC .......... *G06K 9/6245* (2013.01); *G06K 9/622* (2013.01); *G06K 9/6232* (2013.01); *G06K 9/6276* (2013.01); *G06K 9/6277* (2013.01); *G06K 9/6278* (2013.01); *G10L 17/02* (2013.01); *G10L 17/04* (2013.01)

(58) Field of Classification Search
CPC .. G06K 9/6245; G06K 9/6232; G06K 9/6278; G06K 9/6277; G06K 9/6276; G06K 9/622; G10L 17/20; G10L 17/02; G10L 17/04
USPC ................ 382/159, 160, 181, 190, 224, 228
See application file for complete search history.

(56) References Cited

U.S. PATENT DOCUMENTS

| 9,792,899 B2 * | 10/2017 | Aronowitz | .............. G10L 17/04 |
| 2014/0244257 A1 * | 8/2014 | Colibro | ................... G10L 17/20 704/246 |

OTHER PUBLICATIONS

Garcia-Romero, Daniel, and Alan McCree. "Supervised domain adaptation for i-vector based speaker recognition." 2014 IEEE International Conference on Acoustics, Speech and Signal Processing (ICASSP). IEEE, 2014. (Year: 2014).*
Aronowitz, Hagai. "Inter dataset variability compensation for speaker recognition." 2014 IEEE International Conference on Acoustics, Speech and Signal Processing (ICASSP). IEEE, 2014. (Year: 2014).*
Kanagasundaram, Ahilan. Speaker verification using I-vector features. Diss. Queensland University of Technology, 2014. (Year: 2014).*

(Continued)

*Primary Examiner* — Geoffrey E Summers
(74) *Attorney, Agent, or Firm* — Sughrue Mion, PLLC (57) ABSTRACT

The A pattern recognition apparatus using domain adaptation 10 comprises an estimation unit 11. The estimation unit 11 estimates PLDA (Probabilistic Linear Discriminant Analysis) parameters and transformation parameters from features of a first domain data and a second domain data so as to maximize/minimize an objective function with respect to the features.

8 Claims, 10 Drawing Sheets

(56) References Cited

OTHER PUBLICATIONS

Villalba, Jesús, and Eduardo Lleida. "Bayesian adaptation of PLDA based speaker recognition to domains with scarce development data." Odyssey 2012—The Speaker and Language Recognition Workshop. 2012. (Year: 2012).*

Decision to Grant a Patent dated Oct. 23, 2019 from the Japanese Patent Office in application No. 2018-507663.

Cao, X., et al., "A Practical Transfer Learning Algorithm for Face Verification", 2013 IEEE International Conference on Computer Vision, Mar. 3, 2014, pp. 3208-3215, https://ieeexplore.ieee.org/document/6751510.

Daniel Garcia-Romero, et al., "Supervised Domain Adaptation for I-Vector Based Speaker Recognition" 2014 IEEE International Conference on Acoustic, Speech and Signal Processing (ICASSP), May 4, 2014, pp. 4047-4051.

Ahilan Kanagasundaram, et al., "Improving Out-Domain PLDA Speaker Verification Using Unsupervised Inter-Dataset Variability Compensation Approach", 2015 IEEE International Conference on Acoustics, Speech and Signal Processing (ICASSP), Apr. 1, 2015, pp. 4654-4658.

Hagai Aronowitz, et al., "Inter Dataset Variability Compensation for Speaker Recognition", 2014 IEEE International Conference on Acoustics, Speech and Signal Processing (ICASSP), IEEE, May 4, 2014, pp. 4002-4006.

Vishal M. Patel, et al., "Visual Domain Adaption: A survey of recent advances", IEEE Signal Processing Magazine, IEEE Service Center, Piscataway, NJ, US, May 2015, pp. 53-69, vol. 32, No. 3.

Mahsa Baktashmotlagh, et al., "Unsupervised Domain Adaptation by Domain Invariant Projection", 2013 IEEE International Conference on Computer Vision, Dec. 1, 2013, pp. 769-776.

Basura Fernando, et al., "Unsupervised Visual Domain Adaptation Using Subspace Alignment", 2013 IEEE International Conference on Computer Vision, IEEE, Dec. 1, 2013, pp. 2960-2967.

Sergey Ioffe, "Probabilistic Linear Discriminant Analysis", in European Conference on Computer Vision, 2006, pp. 531-542.

Simon J. D. Prince, et al., "Probabilistic Linear Discriminant Analysis for Inferences About Identify", in IEEE International Conference on Computer Vision, 2007, pp. 1-8.

Patrick Kenny, "Bayesian Speaker Verification with Heavy-Tailed Priors", Proc. Odyssey—The Speaker and Language Recognition Workshop, 2010, pp. 1-10.

International Search Report for PCT/JP2015/004716 dated Jun. 8, 2016 [PCT/ISA/210].

Written Opinion for PCT/JP2015/004716 dated Jun. 8, 2016 [PCT/ISA/237].

* cited by examiner

PATTERN RECOGNITION APPARATUS, METHOD, AND PROGRAM USING DOMAIN ADAPTATION

CROSS REFERENCE TO RELATED APPLICATIONS

This application is a National Stage of International Application No. PCT/JP2015/004716 filed Sep. 16, 2015.

TECHNICAL FIELD

The present invention relates to an apparatus, method, and program of domain adaptation for adapting the parameters of a pattern recognition system based on probabilistic linear discriminant analysis (PLDA) to a new domain.

BACKGROUND ART

Pattern recognition systems are widely applied to our daily life to solve real problems in such diverse areas as science, engineering, agriculture, e-commerce, medicine, medical imaging analysis, military, and national security. One important technique in pattern recognition is probabilistic linear discriminant analysis (PLDA) which compensates within-class variability and provides a powerful data-driven mechanism to separate class-specific factors from irrelevant factors. With PLDA, we can build a model of a previously unseen class from a single example, and can combine multiple examples for a better representation of the class. PLDA has been proved effective in face recognition and speaker recognition.

In order to train parameters of PLDA, multiple observations for each of several thousand classes of similar conditions are typically required. However, it is very expensive and even unrealistic to collect such a large amount of resources—in-domain (IND) data—for a new domain of interest for every application. Most available resource-rich data that have already existed are not matched with the domain of interest—this kind of data is called out-of-domain (OOD) data. PLDA trained with OOD data may not be represented properly in IND when mismatch between development and evaluation data is much larger than the variability inside IND. Thus the mismatch of domain between development and evaluation data can greatly deteriorate the performance of pattern recognition systems.

To handle the domain mismatch between development and evaluation data, domain adaptation is applied in order to adapt PLDA parameters developed from already-available OOD data so as to achieve good performance in a new domain where only a small amount of in-domain data is available.

Figure 9:
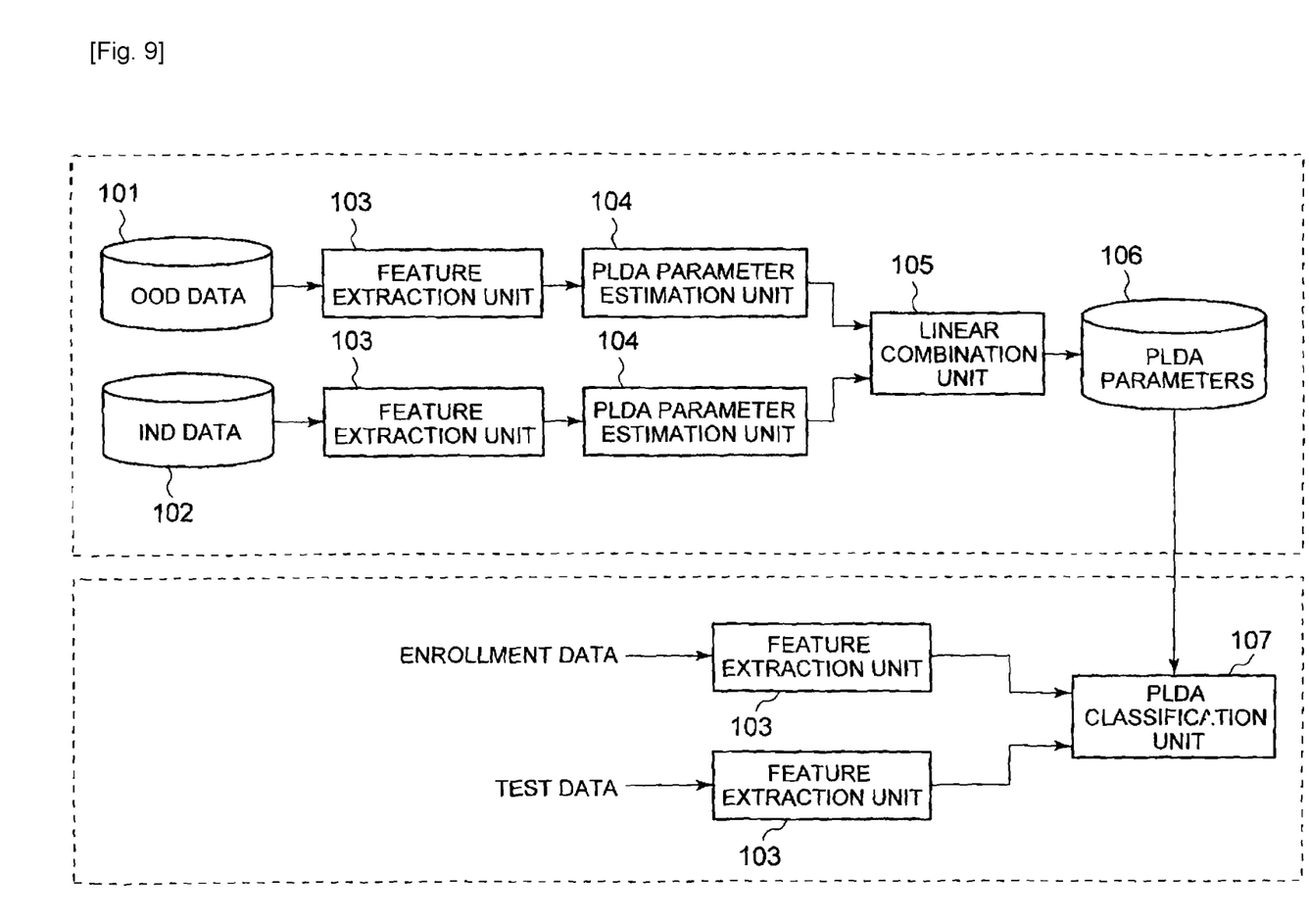
FIG. 9 is a block diagram of related art 1—parameter adaptation using linear combination based on two sets of PLDA parameters trained by OOD and IND data.

Some of the domain adaptation methods employ linear combination of maximum likelihood estimates (see Non Patent Literature (NPL) 1). As shown in FIG. 9, firstly a PLDA parameter estimation unit 104 trains two sets of PLDA parameters separately using features extracted by a feature extraction unit 103 from OOD data 101 and IND data 102, respectively. After the within-class variability $$\Phi_{w_{in}}, \Phi_{w_{out}}$$ [Math.1]

and between-class variability $$\Phi_{b_{in}}, \Phi_{b_{out}}$$ [Math.2]

of OOD and IND are obtained, a linear combination unit 105 combines the two sets of PLDA parameters in the way $$\Phi_b = \alpha \Phi_{b_{in}} + (1-\alpha)\Phi_{b_{out}}, \Phi_w = \alpha \Phi_{w_{in}} + (1-\alpha)\Phi_{w_{out}},$$ [Math.3]

and creates adapted PLDA parameters 106. Here $$\alpha$$ [Math.4]

is a weighting coefficient to determine how much IND data contributes. In the evaluation phase, a PLDA classification unit 107 computes a score for a given pair of features respectively extracted from enrollment and test data. In this method, PLDA parameters $$(\Phi_b, \Phi_w)$$ [Math.5]

are biased toward $$(\Phi_{b_{out}}, \Phi_{w_{out}})$$ [Math.6]

so it can only work when the OOD is close to the IND. However, it is not always true. When the OOD is far from IND, the combined PLDA parameters may not fall in the vicinity of the true parameters. Furthermore, extra training data is necessary to estimate the weighting coefficient $$\alpha.$$ [Math.7]

Hence it is not feasible to compensate the mismatch of domains. FIG. 9 is a block diagram of related art 1—parameter adaptation using linear combination based on two sets of PLDA parameters trained by OOD and IND data.

Figure 10:
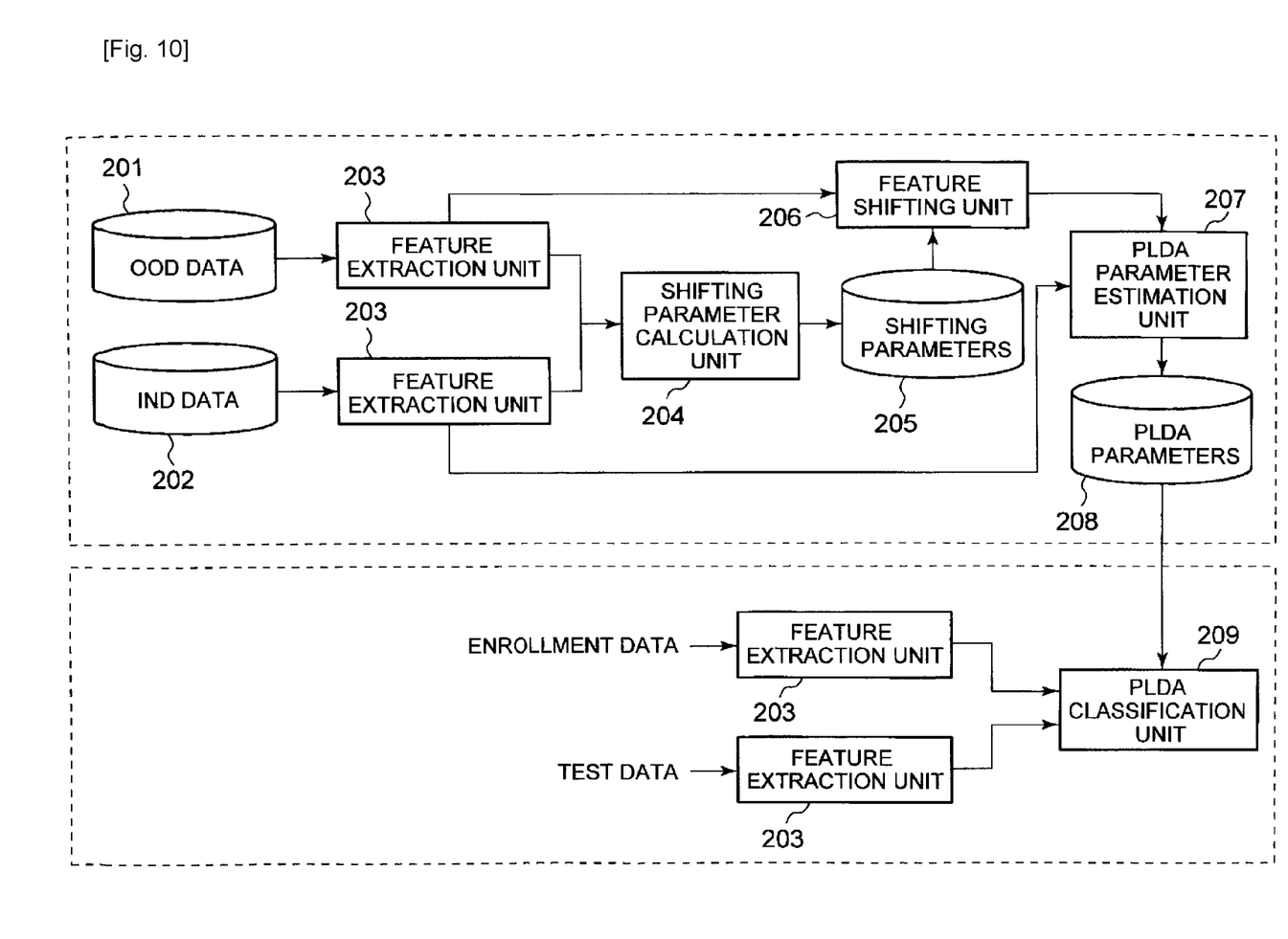
FIG. 10 is a block diagram of related art 2—i-vector compensation.

The method mentioned above focused on parameter adaptation, while another class of methods focuses on data compensation techniques as shown in FIG. 10. FIG. 10 is a block diagram of related art 2—i-vector compensation. It shows the features are shifted by using the knowledge of the statistics of OOD and IND data. In the same way as the previous one, these methods extract two sets of features by a feature extraction unit 203 from OOD data 201 and IND data 202, respectively. It is assumed that there is a shift of data between development (OOD) and evaluation (IND) data because of domain mismatch. They explicitly model dataset variation as a shift in the feature space (204) and reduce it as a pre-processing cleanup step (206). After that, a PLDA parameter estimation unit 207 estimates PLDA parameters 208 from the data in which the data set variation has been reduced (see NPL 2). In the evaluation phase, a PLDA classification unit 209 computes a score in the same way as the PLDA classification 107 in the previous methods. In their method, transformation is not optimized in the framework of PLDA. There are two or more criteria to optimize total system parameters, such as maximum likelihood (ML), minimum distance and so on. Thus, it cannot reach the global optimum.

CITATION LIST

Non Patent Literature

NPL 1: D. Garcia-Romero and A. McCree, "Supervised domain adaptation for i-Vector based speaker recognition", ICASSP, 2014

NPL 2: H. Aronowitz "Inter dataset variability compensation for speaker recognition", ICASSP, 2014

SUMMARY OF INVENTION

Technical Problem

Probabilistic linear discriminant analysis (PLDA) is widely accepted in pattern recognition (face recognition, speaker recognition, etc.). Its function is to compensate the within-class variability and provides a powerful data-driven mechanism to separate class-specific factors of features from irrelevant factors, which brings improvement in recognition performance. However, the success of PLDA is dependent on the availability of a large development set with thousands of multiple observations. Moreover, the development data must match the evaluation data for domains such as illumination conditions and races in face recognition or acoustic environments and transmission channels in speaker recognition.

Because of the strict demand of PLDA for the large amount of data and the practical problems that it is hard and expensive to get sufficient in-domain (IND) data of target domain, we turned to use resource-rich out-of-domain (OOD) data of source domain and apply domain adaptation. Domain adaptation in PLDA is to adapt PLDA parameters developed from already-available OOD data so as to produce good results in a new domain where only a small amount of IND data is available.

Although there are existing approaches to domain adaptation (NPL 1, NPL 2), which try to solve the problem, they also suffer from some drawbacks as follows.

They often have the unrealistic assumption that OOD is close to IND. So in many real applications where the data are not in close domains, adaptation of PLDA parameters is unappropriated because the adapted PLDA parameters $$(\Phi_b, \Phi_w) \quad [\text{Math.8}]$$

are biased toward $$(\Phi_{b_{out}}, \Phi_{w_{out}}) \quad [\text{Math.9}]$$

of OOD. Furthermore, supplemental data and training are needed in order to train an extra weighting coefficient. And there is no explicit relation like affine transformation between OOD and IND data. There are often two or more criteria to optimize system parameters, such as maximum likelihood (ML), minimum distance and so on. Hence, it cannot reach the global optimum.

An object of the present invention is to provide a pattern recognition apparatus using domain adaptation, a pattern recognition method using domain adaptation, and a pattern recognition program using domain adaptation which can optimize transformation parameters and PLDA parameters properly.

Solution to Problem

A pattern recognition apparatus using domain adaptation in accordance with the present invention comprises: an estimation unit which estimates PLDA (Probabilistic Linear Discriminant Analysis) parameters and transformation parameters from features of a first domain data and a second domain data so as to maximize/minimize an objective function with respect to the features.

A pattern recognition method using domain adaptation in accordance with the present invention comprises: estimating PLDA (Probabilistic Linear Discriminant Analysis) parameters and transformation parameters from features of a first domain data and a second domain data so as to maximize/minimize an objective function with respect to the features.

A pattern recognition program using domain adaptation in accordance with the present invention causes a computer to execute: an estimation processing for estimating PLDA (Probabilistic Linear Discriminant Analysis) parameters and transformation parameters from features of a first domain data and a second domain data so as to maximize/minimize an objective function with respect to the features.

Advantageous Effects of Invention

The effect of this invention is that transformation parameters and PLDA parameters can be optimized properly.

DESCRIPTION OF EMBODIMENTS

Hereinafter, exemplary embodiments of the present invention will be described in detail. The implementations are described in complete detail. Along with the illustrative drawings, the explanation provided here is so as to provide a solid guide to a person skilled in the art to practice this invention. The drawings do not limit the application of the technique.

At first, an overall approach is summarized here. It is assumed that between-class and within-class covariance depend on the domains; and also features in one domain can be transformed into the other domain by affine transformation. Hence all feature vectors of IND data will be transformed into the same domain as that of OOD data using transformation parameters. After transformation, IND and OOD data share the same between-class and within-class covariance. Finally, PLDA classifier will give a score of likelihood between the enrollment data and test data, and make decisions.

An advantage of the invention is that the domain mismatch is compensated by feature transformation using PLDA parameters. Another advantage of the present invention is that the PLDA parameters are adapted based on the feature transformation. PLDA parameters are iteratively trained by simultaneously updating the transformation parameters automatically according to the knowledge of both IND and OOD data by only one global criterion, which could acquire better parameters by maximizing or minimizing an objective function defined on the criterion. Furthermore, we don't have the weighting coefficient that needs to be trained as an extra step. With the aid of the invention, it becomes less expensive and more realistic to apply pattern recognition systems to most real applications where a sufficient amount of IND data is hard to collect, such as speaker verification systems operated in different acoustic environments, face recognition systems applied in different illumination conditions and so on.

The invention accordingly comprises of several steps and the relation of one or more of these steps with respect to each of the others, and the apparatus embodying the features of construction, combinations of elements and arrangement of parts that are adapted to affect such steps, all will be exemplified in the following detailed disclosure, i.e. description of drawings and detailed description.

First Embodiment

Figure 4:
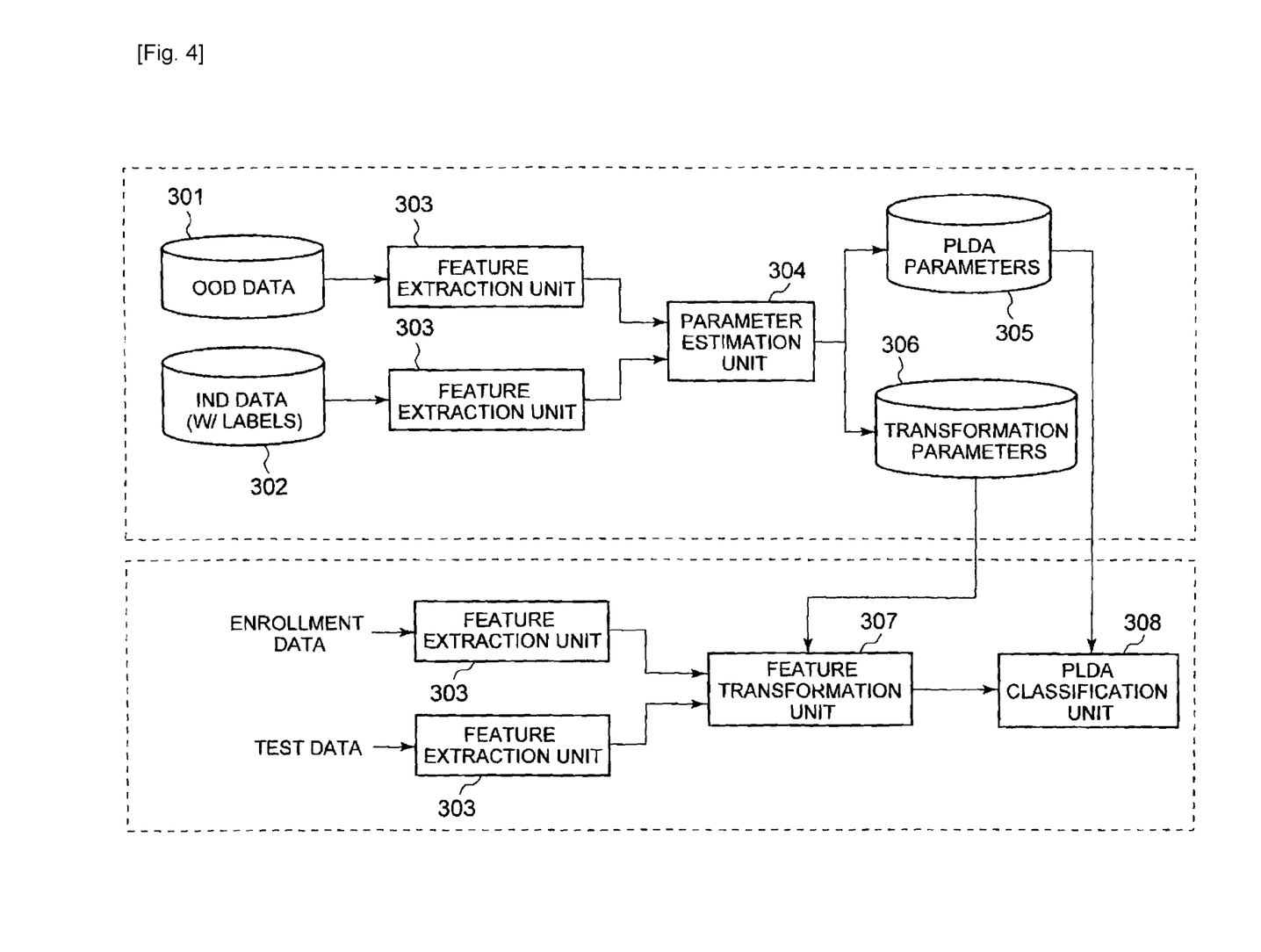
FIG. 4 is a block diagram of the first embodiment of the present invention.

FIG. 4 illustrates a block diagram of the first embodiment of the present invention. The first embodiment of the present invention shows single-step domain adaptation. The first embodiment estimates the PLDA and transformation parameters in the same step. According to FIG. 4, a pattern recognition apparatus using domain adaptation comprises a feature extraction unit 303, a parameter estimation unit 304, storages of PLDA parameters 305 and transformation parameters 306, a feature transformation unit 307 and a PLDA classification unit 308.

In the development part, the feature extraction unit 303 extracts two sets of features from OOD data 301 and IND data 302, respectively. The parameter estimation unit 304 estimates PLDA parameters 305 and transformation parameters 306 from the two sets of features. In the evaluation part, the feature extraction unit 303 extracts features from enrollment and test data, respectively. The feature transformation unit 307 transforms the features into source domain with the transformation parameter 306. Finally, the PLDA classification unit 308 classifies whether the test data and the enrolment data are from the same class.

In the case of face recognition, if the images to be recognized are taken in a different illumination condition from those in PLDA development, there should be a domain mismatch. The images for development are ODD data and those to be recognized are IND data. The feature extraction unit 303 extracts facial features such as the distance between the eyes, width of the nose, shape of cheekbones, length of jawlines and so on. The PLDA classification unit 308 classifies whether the features of the enrolled face image and those from the test face image are from the same identities or not. In the case of speaker recognition, when the system is applied to audios recorded with a specific channel (IND), the available audio data for PLDA training which was recorded with other channels is ODD. The feature extraction unit 303 extracts mel-frequency cepstral coefficients (MFCCs), perceptual linear prediction (PLP) and so on, from the audio data. They are often transformed to another form of features such as a fixed-dimensional vector called i-vector, which is given to the PLDA classification unit 308. The PLDA classification unit 308 classifies whether the features of the enrolled audio data and the features from the test audio data are from the same speakers or not.

The feature extraction unit 303, the parameter estimation unit 304, the feature transformation unit 307, and the PLDA classification unit 308 are realized, for example, by a CPU of a computer operating according to a pattern recognition program. In this case, the CPU may read the program from a computer readable recording medium, for example, a program storage device, and operates as the feature extraction unit 303, the parameter estimation unit 304, the feature transformation unit 307, and the PLDA classification unit 308 according to the program. Alternatively, each of above-mentioned components 303, 304, 307 and 308 may be realized by separate hardware.

Figure 1:
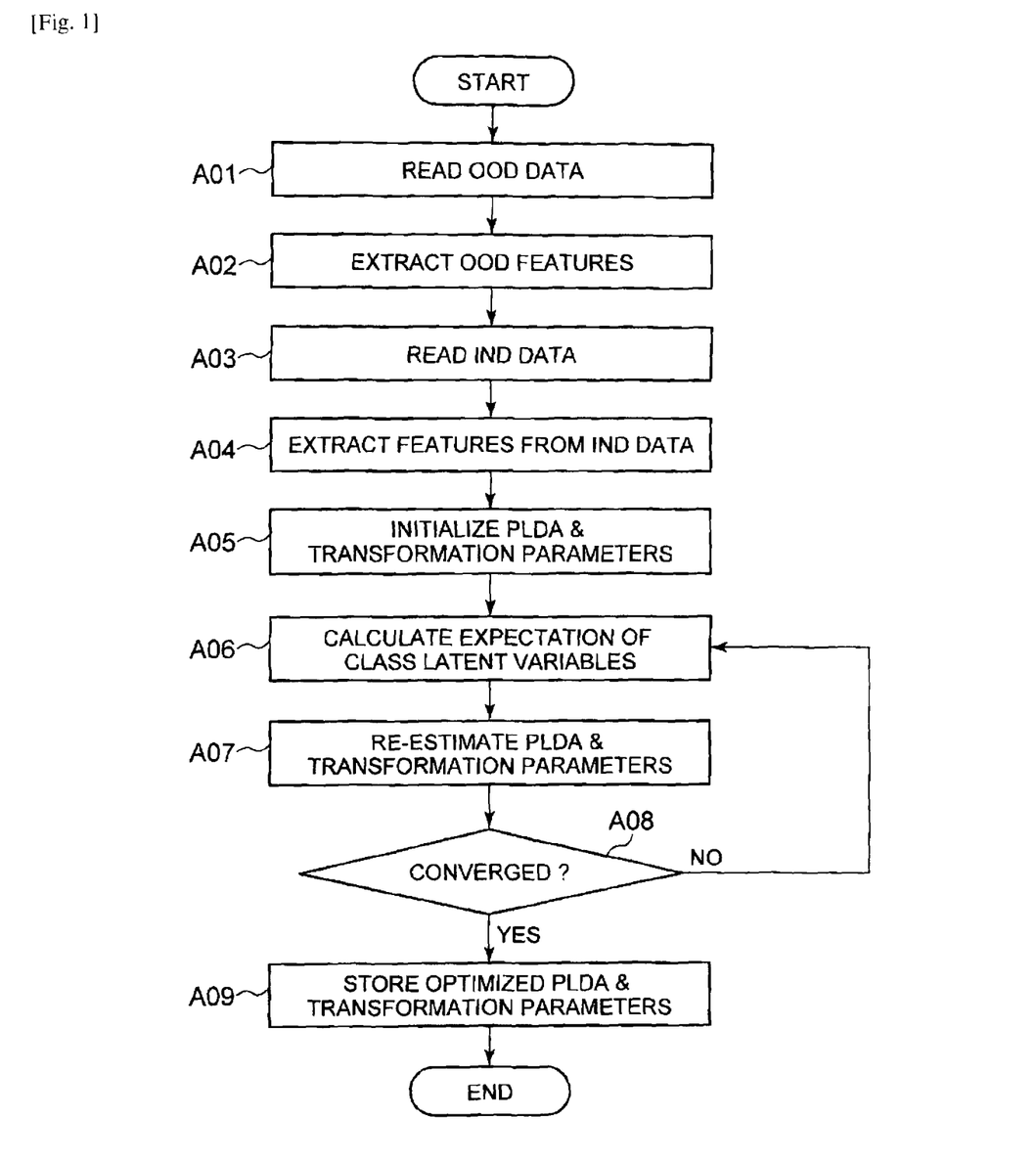
FIG. 1 is a flowchart of the first embodiment of the present invention.

FIG. 1 is a flowchart of the first embodiment of the present invention described with FIG. 4. This shows the development part of the embodiment. First, the feature extraction unit 303 reads OOD data from a storage (Step A01). Secondly, it extracts features from the OOD data (Step A02). Then, it also reads IND data from another storage (Step A03). After that, it extracts features from the IND data (Step A04). Note that the order of Step A01-A04 is not limited to the form presented in FIG. 1. Here, both OOD features and IND features are input into the training. Later steps shows PLDA and transformation parameters are estimated at the same time on the basis of a certain criterion such as maximum likelihood (ML), maximum a posteriori probability (MAP), and Bayesian criteria. In the case of ML, for example, the estimation of those parameters can be performed in an iterative manner by the expectation-maximization (EM) algorithm, where an auxiliary function is derived from the objective function. The parameter estimation unit 304 firstly initializes PLDA and transforms parameters (Step A05). Then the parameter estimation unit 304 calculates the expectations of class latent variables (Step A06). Based on the expectations, the parameter estimation unit 304 re-estimates PLDA and transformation parameters (Step A07). Finally the parameter estimation unit 304 calculates the likelihood of observations of both IND and OOD and compares it to the likelihood with the previous parameters (Step A08). If it converges, i.e. the difference between two likelihoods is smaller than a certain threshold, then the training is finished, and parameters of PLDA and transformation are stored (Step A09). Otherwise, more iterations of the EM algorithm are performed until it is converged.

Figure 3:
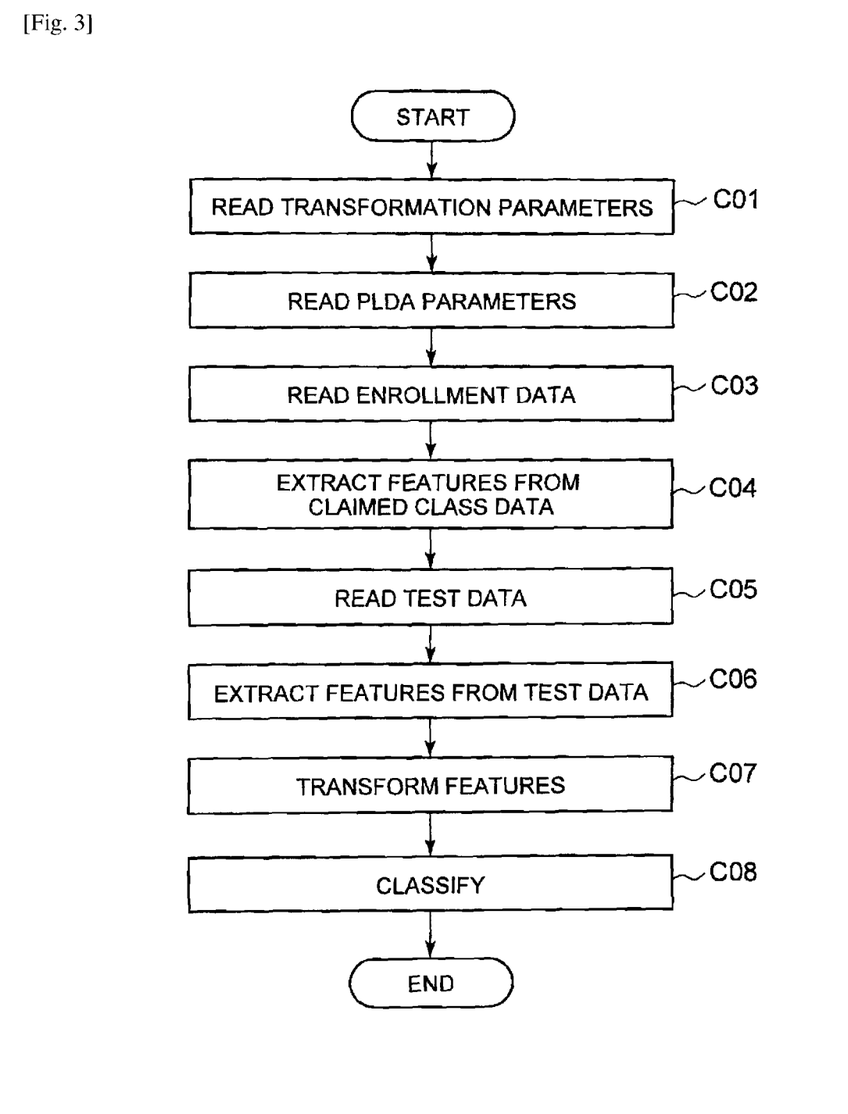
FIG. 3 is a flowchart of testing phase in pattern recognition.

FIG. 3 is another flowchart of the first embodiment of the present invention. This shows the evaluation part of the embodiment. First, the feature transformation unit 307 reads the transformation parameters 306 stored in the storage (Step C01), and the PLDA classification unit 308 reads PLDA parameters 305 from the storage (Step C02). Note that Step C01 and Step C02 are exchangeable. Secondly, an enrollment data is given to the feature extraction unit 303 (Step C03). Then, the feature extraction unit 303 extracts features (Step C04). The same thing is done with test data. The feature extraction unit 303 reads the test data (Step C05) and it extracts features (Step C06). Note that the order of Step C03-C06 is not limited as well. Then, the feature transformation unit 307 transforms features of both enrollment data and test data (Step C07). Finally, the PLDA classification unit 308 classifies the transformed features whether they are from the same class (Step C08).

The present invention is based on the assumptions that the between-class and within-class covariance $$(\Phi_b, \Phi_w) \qquad [\text{Math.10}]$$

depend on the domains—covariance in source domain $$\Phi_b^{(S)}, \Phi_w^{(S)} \qquad [\text{Math.11}]$$

(from OOD) and those in target domain $$\Phi_b^{(T)}, \Phi_w^{(T)} \qquad [\text{Math.12}]$$

(from IND) differ. We also assume that features in target domain $$\tilde{x}_{ij}^{(T)} \qquad [\text{Math.13}]$$

can be transformed into source domain $$\tilde{x}_{ij}^{(T)} \qquad [\text{Math.14}]$$

by applying an affine transformation $$\tilde{x}_{ij}^{(T)} = A x_{ij}^{(T)} + b, \qquad [\text{Math.15}]$$

so that in the source domain, $$x_{ij}^S \qquad [\text{Math.16}]$$

and $$\tilde{x}_{ij}^T \quad \text{[Math.17]}$$

share the same covariances and mean:

$$\tilde{\Phi}_b^{(T)} = A\Phi_b^{(T)}A^T = \Phi_b^{(S)},$$

$$\tilde{\Phi}_w^{(T)} = A\Phi_w^{(T)}A^T = \Phi_w^{(S)},$$

$$\tilde{m}^{(T)} = Am^{(T)} + b = m^{(S)} \quad \text{[Math.18]}$$

where $$(*)^{(T)} \quad \text{[Math.19]}$$

represents IND (target domain);

$$(*)^{(S)} \quad \text{[Math.20]}$$

represents OOD (source domain);

$$\widetilde{(*)}^{(T)} \quad \text{[Math.21]}$$

is transformed IND in source domain, referred to as $$\widetilde{IND}. \quad \text{[Math.22]}$$

So PLDA parameters in the target domain is $$\Phi_b^{(T)} = A^{-1}\Phi_b^{(S)}A^{-T},$$

$$\Phi_w^{(T)} = A^{-1}\Phi_w^{(S)}A^{-T},$$

$$m^{(T)} = A^{-1}(m^{(S)} - b). \quad \text{[Math.23]}$$

Figure 6:
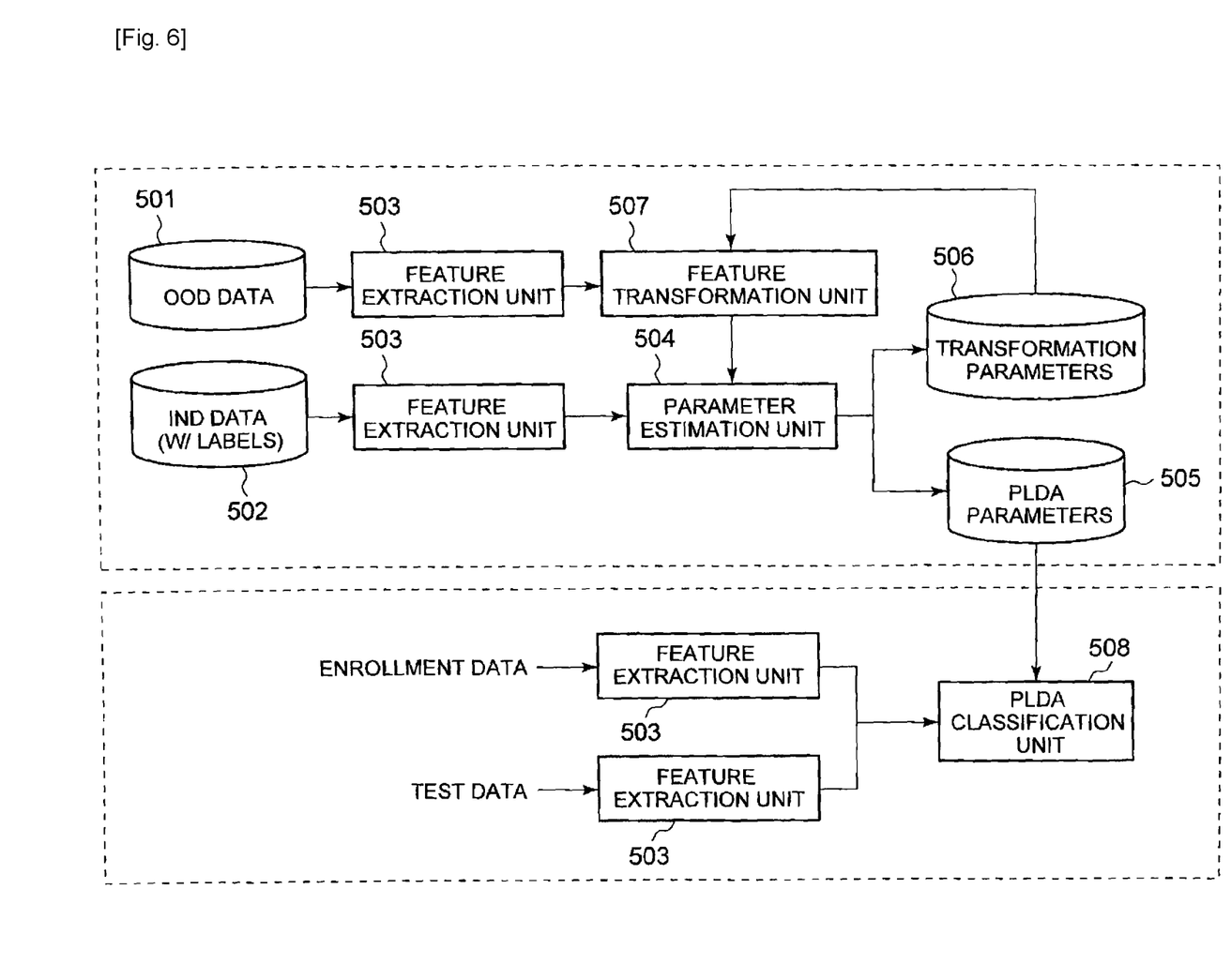
FIG. 6 is a block diagram of the third embodiment of the present invention.

As mentioned above with FIG. 6 and FIG. 1, to optimize the PLDA and transformation parameters $$\theta = (A, b, \Phi_b^{(S)}, \Phi_w^{(S)}) \quad \text{[Math.24]}$$

simultaneously (304), the invention may maximize the likelihood of all observations in the IND and OOD data (FIG. 4). Given $$N^{(S)} \quad \text{[Math.25]}$$

OOD training patterns and $$N^{(T)} \quad \text{[Math.26]}$$

IND training patterns separated into $$K^{(S)} \quad \text{[Math.27]}$$

and $$K^{(T)} \quad \text{[Math.28]}$$

classes respectively, the log-likelihood is $$l(x^1 \ldots N^{(S)}, 1 \ldots N^{(T)}) = \sum_{k=1}^{K^{(S)}} \ln P(x^i : i \in C_k) + \sum_{k=1}^{K^{(T)}} \ln P(x^i : i \in C_k) \quad \text{[Math.29]}$$

where $$P(x^1 \ldots x^{n^{(S)}}) = \int N(y|0, \Phi_b^{(S)}) N(x^1|y, \Phi_w^{(S)}) \ldots N(x^{n^{(S)}}|y, \Phi_w^{(S)}) dy,$$

$$P(x^1 \ldots x^{n^{(T)}}) = \int N(y|0, \Phi_b^{(T)}) N(x^1|y, \Phi_w^{(T)}) \ldots N(x^{n^{(T)}}|y, \Phi_w^{(T)}) dy, \quad \text{[Math.30]}$$

are the joint probability distributions of sets of $$n^{(S)} \quad \text{[Math.31]}$$

or $$n^{(T)} \quad \text{[Math.32]}$$

patterns belonging to the same class.

We may use the EM algorithm to update the parameters of a PLDA-based acoustic model. For instance, the auxiliary function to update PLDA parameters $$\Phi_b, \Phi_w \quad \text{[Math.33]}$$

and transformation parameters $$A, b \quad \text{[Math.34]}$$

is $$Q(\theta, \bar{\theta}) = \sum_{i=1}^{K^{(S)}} \int p(y^{(S)} | X_i^{(S)}, \bar{\theta}) \log p(X_i^{(S)}, y^{(S)} | \theta) dy^{(S)} + \sum_{i=1}^{K^{(T)}} \int p(y^{(T)} | X_i^{(T)}, \bar{\theta}) \log p(X_i^{(T)}, y^{(T)} | \theta) dy^{(T)}. \quad \text{[Math. 35]}$$

In the following expression, all $$\Phi_b, \Phi_w \quad \text{[Math.36]}$$

and $$m \quad \text{[Math.37]}$$

represent the parameters in source domain $$\Phi_b^{(S)}, \Phi_w^{(S)} \quad \text{[Math.38]}$$

and $$m^{(S)}. \quad \text{[Math.39]}$$

E-Step:

Posterior distributions of the latent variables $$y \quad \text{[Math.40]}$$

are computed, using the Bayes' rule $$p(y_i^{(S)} | X_i^{(S)}) = \frac{p(X_i^{(S)} | y_i^{(S)}) p(y_i^{(S)})}{p(X_i^{(S)})} = \mathcal{N}(\tilde{L}_i^{(S)-1} \tilde{\gamma}_i^{(S)}, \tilde{L}_i^{(S)-1}),$$

$$p(y_i^{(T)} | X_i^{(T)}) = \frac{p(X_i^{(T)} | y_i^{(T)}) p(y_i^{(T)})}{p(X_i^{(T)})} = \mathcal{N}(\tilde{L}_i^{(T)-1} \tilde{\gamma}_i^{(T)}, \tilde{L}_i^{(T)-1}), \quad \text{[Math. 41]}$$

where $$\begin{cases} L_i^{(S)} = \overline{\Phi_b}^{-1} + n_i^{(S)} \overline{\Phi_w}^{-1} \\ \gamma_i^{(S)} = \overline{\Phi_b}^{-1} \overline{m} + n_i^{(S)} \overline{\Phi_w}^{-1} \overline{x}_i^{(S)} \\ L_i^{(T)} = \left(\overline{A}^{-1} \overline{\Phi_b} \overline{A}^{-T}\right)^{-1} + n_i^{(T)} \left(\overline{A}^{-1} \overline{\Phi_w} \overline{A}^{-T}\right)^{-1} \\ \gamma_i^{(T)} = \left(\overline{A}^{-1} \overline{\Phi_b} \overline{A}^{-T}\right)^{-1} \left(\overline{A}^{-1} (\overline{m} - \overline{b})\right) + n_i^{(T)} \left(\overline{A}^{-1} \overline{\Phi_w} \overline{A}^{-T}\right)^{-1} \overline{x}_i^{(T)} \end{cases} \quad \text{[Math. 42]}$$

M-Step:

By setting the derivatives of $$Q \quad \text{[Math.43]}$$

respected to each parameter as zero, the solutions are obtained from the following equations:

$$\Phi_b = (K^{(S)} + K^{(T)})^{-1} \quad \text{[Math. 44]}$$

$$\left\{ \sum_{i=1}^{K^{(S)}} \left[ L_i^{(S)^{-1}} + \left( L_i^{(S)^{-1}} \gamma_i^{(S)} - m \right) \left( L_i^{(S)^{-1}} \gamma_i^{(S)} - m \right)^T \right] + \right.$$

$$\sum_{i=1}^{K^{(T)}} \left[ A L_i^{(T)^{-1}} A^T + \right.$$

$$\left. \left( A L_i^{(T)^{-1}} \gamma_i^{(T)} + b - m \right) \left( A L_i^{(T)^{-1}} \gamma_i^{(T)} + b - m \right)^T \right] \right\}$$

$$\Phi_w = (N^{(S)} + N^{(T)})^{-1} \quad \text{[Math. 45]}$$

$$\left\{ \sum_{i=1}^{K} \sum_{j=1}^{n_i} \left[ L_i^{(S)^{-1}} + \left( L_i^{(S)^{-1}} \gamma_i^{(S)} - x_{ij}^{(S)} \right) \left( L_i^{(S)^{-1}} \gamma_i^{(S)} - x_{ij}^{(S)} \right)^T \right] + \right.$$

$$\sum_{i=1}^{K^{(T)}} \sum_{j=1}^{n_i} \left[ A L_i^{(T)^{-1}} A^T + \right.$$

$$\left. \left( A L_i^{(T)^{-1}} \gamma_i^{(T)} - A x_{ij}^{(T)} \right) \left( A L_i^{(T)^{-1}} \gamma_i^{(T)} - A x_{ij}^{(T)} \right)^T \right] \right\}$$

$$(N^{(T)} + K^{(T)}) A^{-T} - \Phi_b^{(S)^{-1}} A \sum_{i=1}^{K^{(T)}} \left[ L_i^{(T)^{-1}} + \quad \text{[Math. 46]} \right.$$

$$\left( L_i^{(T)^{-1}} \gamma_i^{(T)} - \frac{1}{K^{(T)}} \sum_{i=1}^{K^{(T)}} \left( L_i^{(T)^{-1}} \gamma_i^{(T)} \right) \right) \left( L_i^{(T)^{-1}} \gamma_i^{(T)} \right)^T \right] -$$

$$\Phi_w^{(S)^{-1}} A \sum_{i=1}^{K} \left[ n_i L_i^{(T)^{-1}} + n_i \left( \bar{x}_i - L_i^{(T)^{-1}} \gamma_i^{(T)} \right) \right.$$

$$\left. \left( \bar{x}_i - L_i^{(T)^{-1}} \gamma_i^{(T)} \right)^T + \sum_{j=1}^{n_i} x_{ij} x_{ij}^T - n_i \bar{x}_i \bar{x}_i^T \right] = 0$$

$$b = m - \frac{1}{K^{(T)}} \sum_{i=1}^{K} \left( A L_i^{(T)^{-1}} \gamma_i^{(T)} \right) \quad \text{[Math. 47]}$$

The $$(\Phi_b, \Phi_w) \quad \text{[Math.48]}$$

is stored as PLDA parameters 305 and $$(A, b) \quad \text{[Math.49]}$$

are stored as transformation parameters 306.

Second Embodiment

Figure 5:
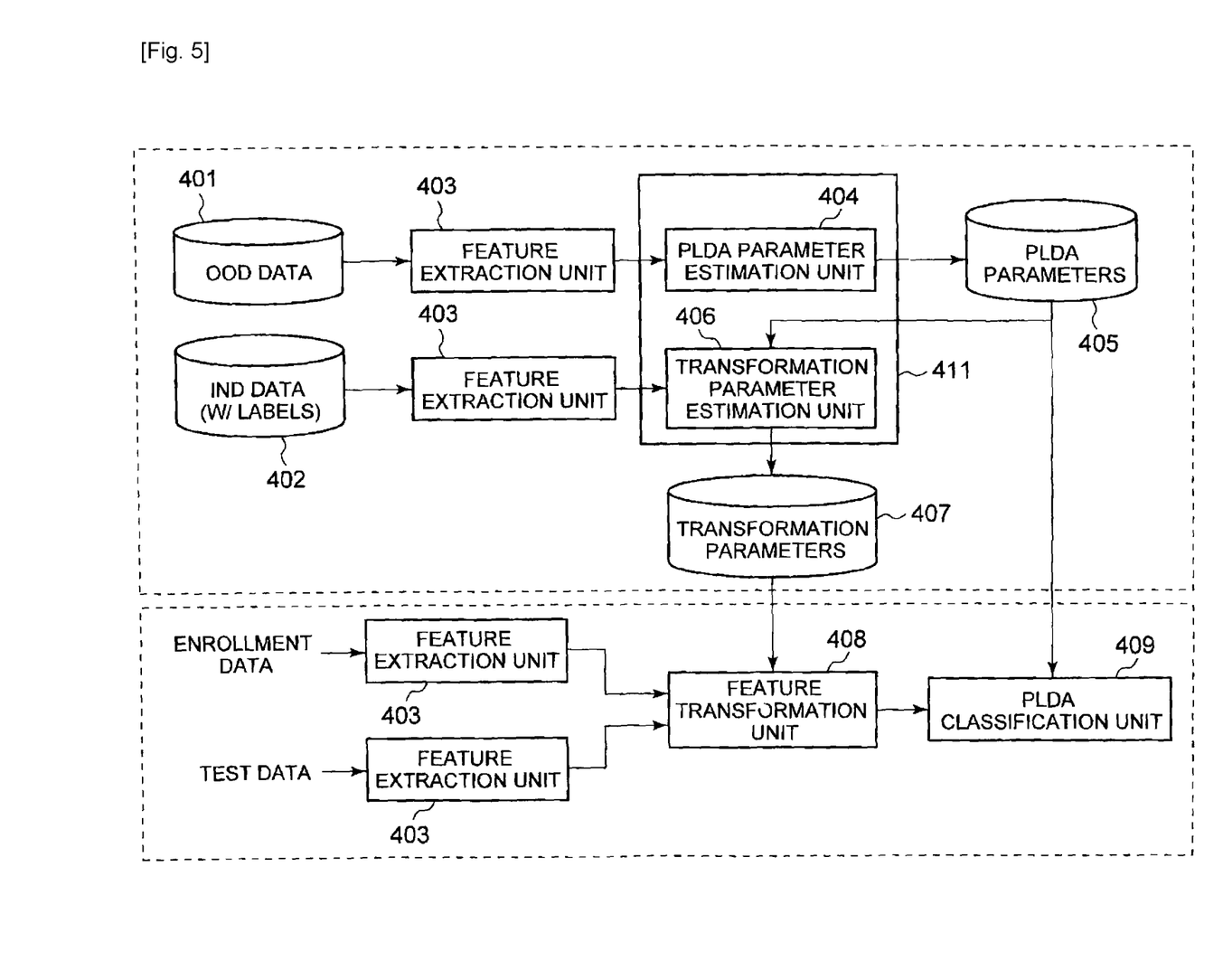
FIG. 5 is a block diagram of the second embodiment of the present invention.

FIG. 5 illustrates a block diagram of the second embodiment of the present invention. The second embodiment of the present invention shows 2 step domain adaptation training. The second embodiment of the present invention shows the two training loops of PLDA parameter estimation and transformation parameter estimation (see FIG. 2). According to FIG. 5, a pattern recognition apparatus using domain adaptation comprises a feature extraction unit 403, an estimation unit 411, a storage of PLDA parameters 405, a storage of transformation parameters 407, a feature transformation unit 408 and a PLDA classification unit 409. The estimation unit 411 comprises a PLDA parameter estimation unit 404 and a transformation parameter estimation unit 406.

The feature extraction unit 403 extracts two sets of features from OOD data 401 and IND data 402, respectively. The PLDA parameter estimation unit 404 estimates PLDA parameters 405 from the features of OOD data 301. The transformation parameter estimation unit 406 estimates transformation parameters 407 using PLDA parameters 405 and the features of IND data 402 by maximizing or minimizing an objective function defined on the criterion. In the evaluation part, the feature extraction unit 403 extracts features from enrollment data and test data, respectively. The feature transformation unit 408 transforms the features into source domain with the transformation parameter 407. Finally, the PLDA classification unit 409 classifies whether the test data and the enrolment data are from the some class.

The feature extraction unit 403, the estimation unit 411 (the PLDA parameter estimation unit 404 and the transformation parameter estimation unit 406), the feature transformation unit 408, and the PLDA classification unit 409 are realized, for example, by a CPU of a computer operating according to a pattern recognition program. In this case, the CPU may read the program from a computer readable recording medium, for example, a program storage device, and operates as the feature extraction unit 403, the estimation unit 411 (the PLDA parameter estimation unit 404 and the transformation parameter estimation unit 406), the feature transformation unit 408, and the PLDA classification unit 409 according to the program. Alternatively, each of above-mentioned components 403, 404, 406 408 and 409 may be realized by separate hardware.

Figure 2:
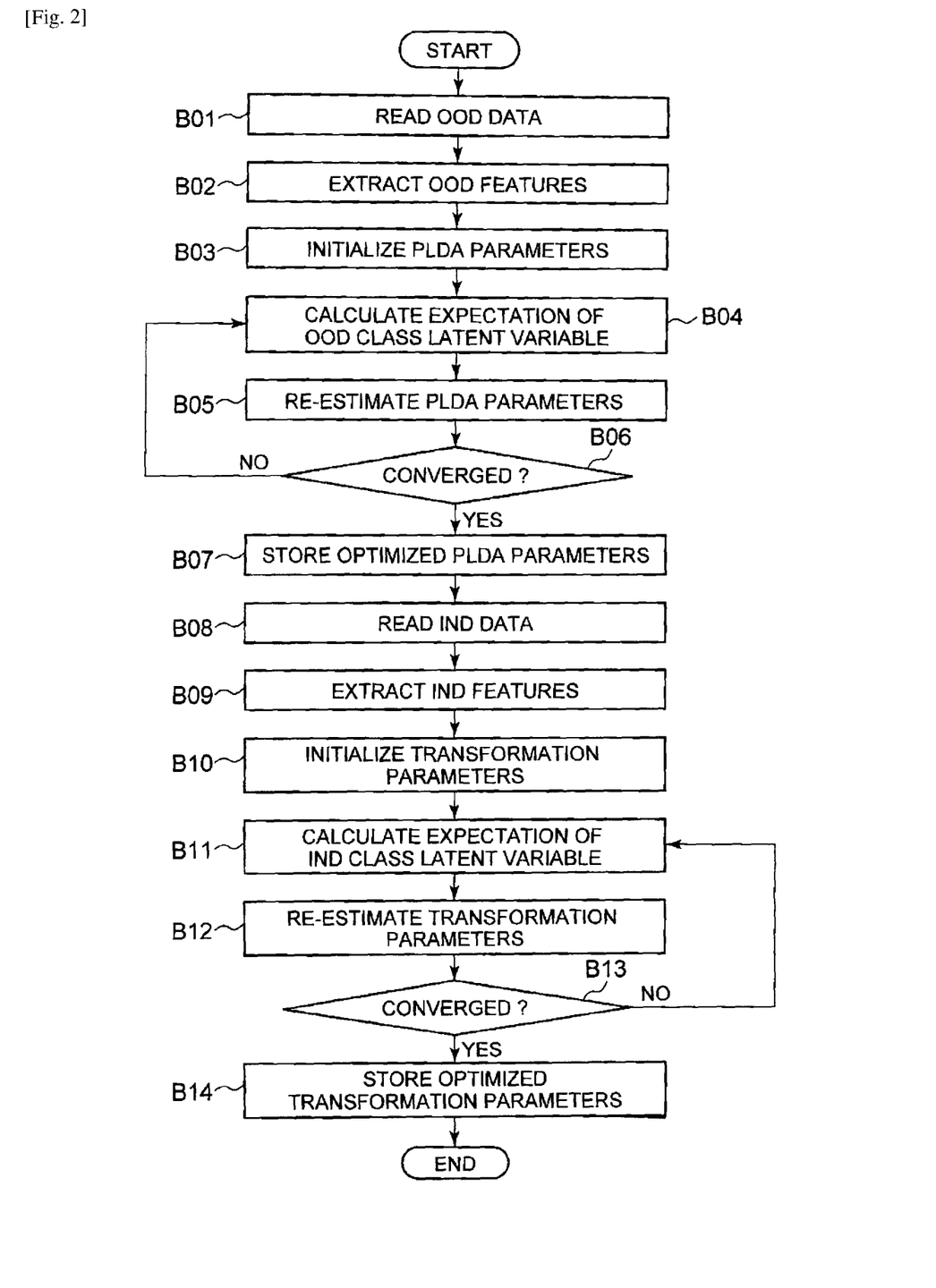
FIG. 2 is a flowchart of the second embodiment of the present invention.

FIG. 2 is a flowchart of the second embodiment of the present invention described with FIG. 5. This shows the development part of the embodiment. First, the feature extraction unit 403 reads OOD data from a storage (Step B01). Secondly, it extracts features from the OOD data (Step B02). Then PLDA parameters are estimated in the following steps. Firstly the PLDA parameter estimation unit 404 initializes PLDA parameters (Step B03). And then the PLDA parameter estimation unit 404 estimates PLDA parameters on the basis of a certain criterion such as maximum likelihood (ML), maximum a posteriori probability (MAP), and Bayesian criteria. In the case of ML, for example, the estimation of those parameters can be performed in an iterative manner by the expectation-maximization (EM) algorithm. The PLDA parameter estimation unit 404 calculates the expectations of class latent variables (Step B04). Based on the expectations, the PLDA parameter estimation unit 404 re-estimates PLDA parameters (Step B05). Then the PLDA parameter estimation unit 404 calculates again the likelihood of observations with respect to OOD and compares it to the likelihood with the previous estimated parameters (Step B06). If it converges, i.e. the difference between two likelihoods is smaller than a certain threshold, then the training is finished, and parameters of PLDA are stored (Step B07). Otherwise, more iterations of the EM algorithm are performed until convergence.

The PLDA parameter estimation unit 404 estimates PLDA parameters in accordance with the re-estimation formulae, for example, described in Reference 1.

Reference 1

S. Ioffe, "Probabilistic linear discriminant analysis", In European Conference on Computer Vision, 2006

After PLDA parameters are estimated, transformation parameters are trained as next. First, the feature extraction unit 403 reads IND data from a storage (Step B08). Secondly, it extracts features from the IND data (Step B09). Then the transformation parameter estimation unit 406 initializes the transformation parameters (Step B10). And the transformation parameter estimation unit 406 estimates them on the basis of a certain criterion, such as ML, MAP, and Bayesian criteria, which can be one of a various criteria. In the case of ML, the transformation parameter estimation unit 406 calculates the expectations of class latent variables (Step B11). Based on the expectations, the transformation parameter estimation unit 406 re-estimates transformation parameters (Step B12). The transformation parameter estimation unit 406 calculates again the likelihood of observations of IND and compares it to the likelihood with the previous parameters (Step B13). If it is converged, i.e. the difference between two likelihoods is smaller than a certain threshold, then the training is finished, and transformation parameters are stored (Step B14). Otherwise, more iterations of the EM algorithm are performed until convergence.

The evaluation part of the second embodiment is similar to that of the first embodiment and follows the same flow shown in the flowchart of FIG. 3.

The second embodiment shares the same assumptions of the first embodiment that the between-class and within-class covariance $$(\Phi_b, \Phi_w) \quad \text{[Math.50]}$$

depend on the domains, and that features in target domain $$x_{ij}^{(T)} \quad \text{[Math.51]}$$

can be transformed into source domain $$\hat{x}_{ij}^{(T)} \quad \text{[Math.52]}$$

by applying an affine transformation $$\hat{x}_{ij}^{(T)} = A x_{ij}^{(T)} + b. \quad \text{[Math.53]}$$

As described with FIG. 5 and FIG. 2, this embodiment optimizes the PLDA parameters using OOD data (404), and the transformation parameters $$(A, b) \quad \text{[Math.54]}$$

using IND data (406). Then the feature transformation unit 408 transforms all evaluation data into the source domain and the PLDA classification unit 409 is applied to the transformed features. In the estimation of the transformation parameters $$\theta = (A, b) \quad \text{[Math.55]}$$

(406), covariances $$\Phi_b, \Phi_w \quad \text{[Math.56]}$$

and mean $$m \quad \text{[Math.57]}$$

of source domain are given (405). With ML criterion, by setting the derivatives of $$Q \quad \text{[Math.58]}$$

respected to each parameter as zero, parameters are estimated from following equations:

$$\begin{cases} L_i = \left(\overline{A}^{-1}\Phi_b\overline{A}^{-T}\right)^{-1} + n_i\left(\overline{A}^{-1}\Phi_w\overline{A}^{-T}\right)^{-1} \\ \gamma_i = \left(\overline{A}^{-1}\Phi_b\overline{A}^{-T}\right)^{-1}\left(\overline{A}^{-1}(m-\overline{b})\right) + n_i\left(\overline{A}^{-1}\Phi_w\overline{A}^{-T}\right)^{-1}\overline{x}_i \end{cases} \quad \text{[Math. 59]}$$

$$(N+K)A^{-T} = \quad \text{[Math. 60]}$$

$$\Phi_b^{-1}A\sum_{i=1}^{K}\left[L_i^{-1} + \left(L_i^{-1}\gamma_i - \frac{1}{K}\sum_{i=1}^{K}(L_i^{-1}\gamma_i)\right)(L_i^{-1}\gamma_i)^T\right] +$$

$$\Phi_w^{-1}A\sum_{i=1}^{K}\left(n_i L_i^{-1} + n_i(\overline{x}_i - L_i^{-1}\gamma_i)(\overline{x}_i - L_i^{-1}\gamma_i)^T + \sum_{j=1}^{n_i}x_{ij}x_{ij}^T - n_i\overline{x}_i\overline{x}_i^T\right)$$

$$b = m - \frac{1}{K}\sum_{i=1}^{K}(AL_i^{-1}\gamma_i), \quad \text{[Math. 61]}$$

where $$K \quad \text{[Math.62]}$$

is the number of classes and $$N \quad \text{[Math.63]}$$

is the number of observations in target domain.

As has been shown in the previous paragraphs, the second embodiment estimates the PLDA and transformation parameters separately in two steps, which makes the entire estimation process less complicated keeping the only one global criterion. The advantage of the second embodiment is that it can obtain the parameters with higher computational efficiency and low memory consumption than the first embodiment can.

After finishing the first two steps—PLDA and transformation parameter estimation, we get the transformation parameters which can transform the IND development data and evaluation data in target domain into the source domain, so that all data are matched. We can also continue to update the covariance by adding $$I\tilde{N}D \quad \text{[Math. 64]}$$

dataset to OOD dataset. By repeating these steps iteratively we will get an optimized transformation parameters and PLDA for the merged domain.

Third Embodiment

FIG. 6 illustrates a block diagram of the third embodiment of the present invention. The third embodiment is an alternative that applies transformation to development data. According to FIG. 6, a pattern recognition apparatus using domain adaptation comprises a feature extraction unit 503, a parameter estimation unit 504, a storage of PLDA parameters 505, a storage of transformation parameters 506, a feature transformation unit 507 and a PLDA classification unit 508.

In the first embodiment, the feature transformation unit 307 is in the evaluation part. On the other hand, in the third embodiment, the feature transformation unit 507 is in the development part. The feature transformation unit 507 transforms the features of OOD data to the domain of the IND domain using the transformation parameters 506. The domain mismatch is compensated in development part. The rest of the third embodiment (503, 504, 505, 506) works in the same way as that in the first embodiment (303, 304, 305, 306). In its parameter estimation, very similar re-estimation formulae are derived assuming an affine transformation in the opposite way from the previous embodiments, i.e. the transformation from the source domain to the target domain. In evaluation part, the PLDA classification unit 508 classifies whether the test data belongs to the same class as the enrollment data using the PLDA parameters 505.

The feature extraction unit 503, the parameter estimation unit 504, the feature transformation unit 507, and the PLDA classification unit 508 are realized, for example, by a CPU of a computer operating according to a pattern recognition program. In this case, the CPU may read the program from a computer readable recording medium, for example, a program storage device, and operates as the feature extraction unit 503, the parameter estimation unit 504, the feature transformation unit 507, and the PLDA classification unit 508 according to the program. Alternatively, each of above-mentioned components 503, 504, 507 and 508 may be realized by separate hardware.

Forth Embodiment

Figure 7:
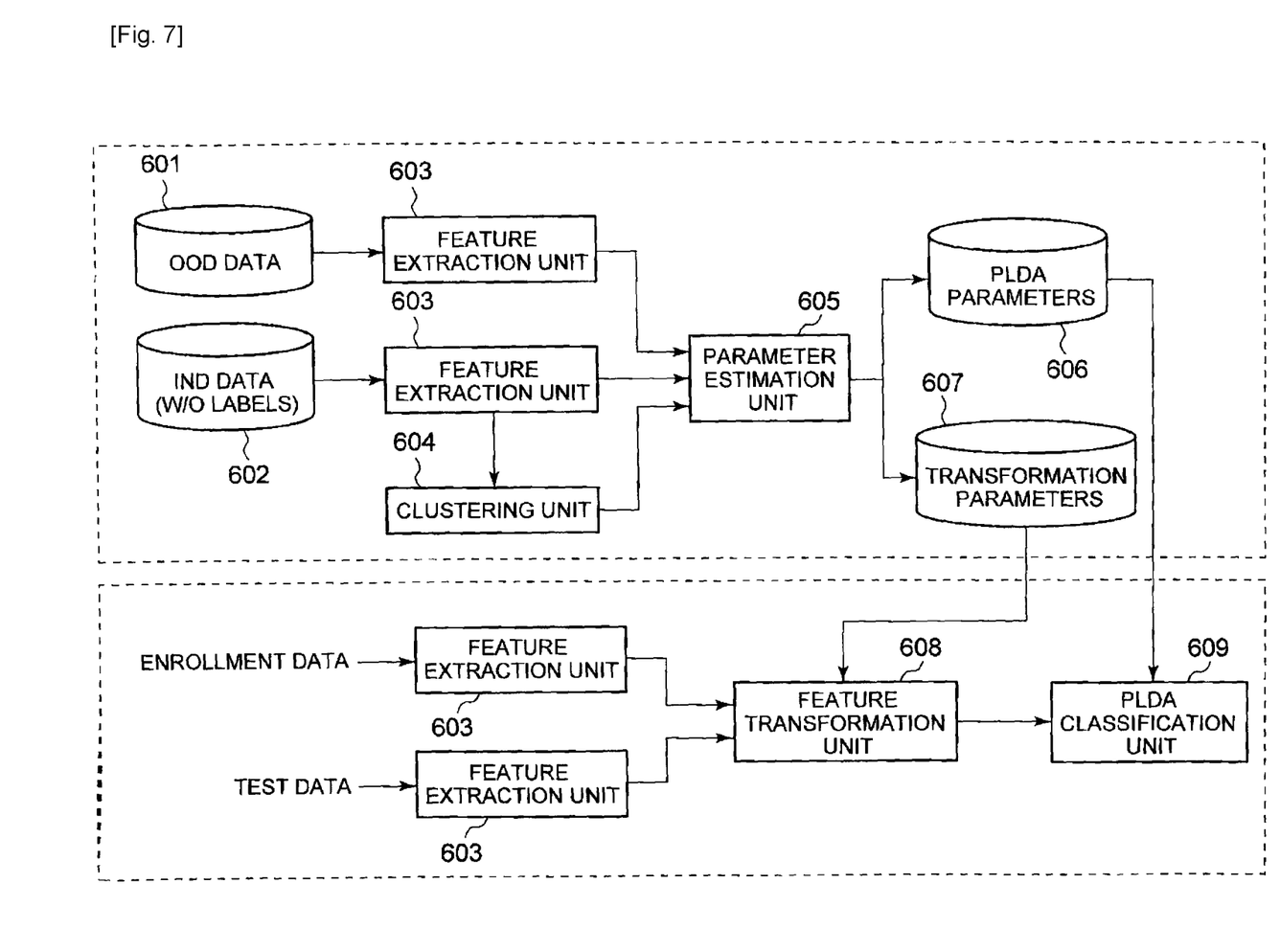
FIG. 7 is a block diagram of the forth embodiment of the present invention.

FIG. 7 illustrates a block diagram of the forth embodiment of the present invention. The forth embodiment shows single step unsupervised domain adaptation training. According to FIG. 7, a pattern recognition apparatus using domain adaptation comprises a feature extraction unit 603, a clustering unit 604, a parameter estimation unit 605, a storage of PLDA parameters 606, a storage of transformation parameters 607, a feature transformation unit 608 and a PLDA classification unit 609.

The clustering unit 604 clusters IND data so that each pair of the data from the same class is assigned to the same cluster and that each pair of the data from different classes is assigned to different clusters. The parameter estimation unit 605 estimates the PLDA parameters 606 and the transformation parameters 607 using the information of the clusters. The rest of the forth embodiment (603, 608, 609) works in the same way as that in the first embodiment (303, 307, 308).

The feature extraction unit 603, the clustering unit 604, the parameter estimation unit 605, the feature transformation unit 608, and the PLDA classification unit 609 are realized, for example, by a CPU of a computer operating according to a pattern recognition program. In this case, the CPU may read the program from a computer readable recording medium, for example, a program storage device, and operates as the feature extraction unit 603, the clustering unit 604, the parameter estimation unit 605, the feature transformation unit 608, and the PLDA classification unit 609. Alternatively, each of above-mentioned components 603, 604, 605, 608 and 609 may be realized by separate hardware.

In the embodiments described so far have assumed a certain class of PLDA modeling presented by Reference 1. It should be noted that the present invention can be practiced with any other PLDA modeling such as Reference 2 and its variants such as Reference 3.

Reference 2

S. J. D. Prince, J. H. Elder, "Probabilistic linear discriminant analysis for inferences about identity", In IEEE International Conference on Computer Vision, 2007

Reference 3

P. Kenny, "Bayesian speaker verification with heavy-tailed priors", in Proc. Odyssey—The Speaker and Language Recognition Workshop, 2010

Even though the evaluation parts of the embodiments described so far have focused on the decision making of whether two data inputs are from the same class or not, it can be easily extended to any kinds of decision making such as multi-class classification, which is shown in Reference 2. In such a case, the features of multiple test data are classified whether each of the multiple test data belongs to the same class as the enrollment data, and the most similar test data to the enrollment data is selected.

As a final point, it should be clear that the process, techniques and methodology described and illustrated here are not limited or related to a particular apparatus. It can be implemented using a combination of components. Also various types of general purpose device may be used in accordance with the instructions herein. The present invention has also been described using a particular set of examples. However, these are merely illustrative and not restrictive. For example the described software may be implemented in a wide variety of languages such as C++, Java, Python and Perl etc. Moreover other implementations of the inventive technology will be apparent to those skilled in the art.

The present invention is able to optimize the transformation and PLDA parameters simultaneously using only one global criterion, and transform OOD and IND data to the same domain even when the OOD is not close to the IND.

Figure 8:
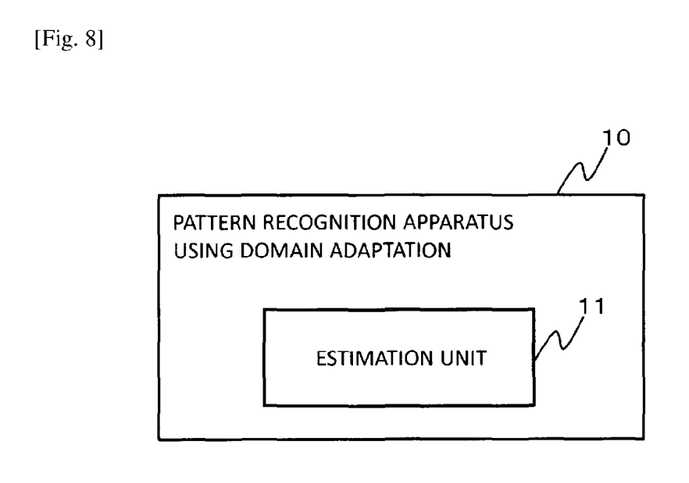
FIG. 8 is a block diagram showing an overview of the present invention.

FIG. 8 is a block diagram showing an overview of the present invention. A pattern recognition apparatus using domain adaptation comprising 10 comprises an estimation unit 11. The estimation unit 11 (for example, the parameter estimation unit 304, the estimation unit 411, the parameter estimation unit 504, the parameter estimation unit 605) estimates PLDA parameters and transformation parameters from features of a first domain data and a second domain data so as to maximize/minimize an objective function with respect to the features.

A part or the whole of the embodiments may also be described as the following supplementary notes, but is not limited to the followings.

(Supplementary Note 1)

A pattern recognition apparatus using domain adaptation comprising:

an estimation unit which estimates PLDA (Probabilistic Linear Discriminant Analysis) parameters and transformation parameters from features of a first domain data and a second domain data so as to maximize/minimize an objective function with respect to the features.

(Supplementary Note 2)

The pattern recognition apparatus according to supplementary note 1 further comprising:

a feature transformation unit which transforms features of enrollment and test data observed in one of the domain to the other domain using the transformation parameters; and a classification unit which classifies whether the test data belongs to the same class as the enrollment data using the PLDA parameters.

(Supplementary Note 3)

The pattern recognition apparatus according to supplementary note 1 further comprising:

a feature transformation unit which transforms the features of one of the first and second domain data to the domain of the other using the transformation parameters; and a classification unit which classifies whether test data belongs to the same class as enrollment data using the PLDA parameters.

(Supplementary Note 4)

The pattern recognition apparatus according to supplementary note 1, wherein the PLDA parameters are estimated from the features of the first domain data, and using the estimated PLDA parameters the transformation parameters are estimated from the second domain data so that the PLDA and transformation parameters maximize/minimize the objective function.

(Supplementary Note 5)

The pattern recognition apparatus according to supplementary note 2 or 3, wherein the features of multiple test data are classified whether each of the multiple test data belongs to the same class as the enrollment data, and the most similar test data to the enrollment data is selected.

(Supplementary Note 6)

The pattern recognition apparatus according to supplementary note 1 further comprising:

a clustering unit which clusters one of the first domain data and the second domain data so that each pair of the data from the same class is assigned to the same cluster and that each pair of the data from different classes is assigned to different clusters; and the PLDA parameters and the transformation parameters are estimated using the information of the clusters.

(Supplementary Note 7)

The pattern recognition apparatus according to supplementary note 1, wherein the objective function is at least one of the likelihood, the a posteriori probability, the Bayesian probability of the PLDA and transformation parameters.

(Supplementary Note 8)

The pattern recognition apparatus according to supplementary note 7, wherein the PLDA parameters and the transformation parameters are iteratively updated in accordance with an auxiliary function derived from the objective function.

(Supplementary Note 9)

The pattern recognition apparatus according to supplementary note 1 or 4, wherein the feature transformation is represented as an affine transformation between the first domain data and the second domain data.

(Supplementary Note 10)

A pattern recognition method using domain adaptation comprising:

estimating PLDA (Probabilistic Linear Discriminant Analysis) parameters and transformation parameters from features of a first domain data and a second domain data so as to maximize/minimize an objective function with respect to the features.

(Supplementary Note 11)

A pattern recognition program using domain adaptation for causing a computer to execute:

an estimation processing for estimating PLDA (Probabilistic Linear Discriminant Analysis) parameters and transformation parameters from features of a first domain data and a second domain data so as to maximize/minimize an objective function with respect to the features.

REFERENCE SIGNS LIST 303, 403, 503, 603 feature extraction unit
304, 504, 605 parameter estimation unit
307, 408, 507, 608 feature transformation unit
308, 409, 508, 609 PLDA classification unit
404 PLDA parameter estimation unit
406 transformation parameter estimation unit

The invention claimed is:

1. A pattern recognition apparatus using domain adaptation comprising:
at least one processor configured to
estimate PLDA (Probabilistic Linear Discriminant Analysis) parameters and transformation parameters from features of a first domain data and a second domain data so as to maximize/minimize an objective function with respect to the features;
transform features of enrollment and test data observed in one of the domains to the other domain using the transformation parameters; and
classify whether the test data belongs to the same class as the enrollment data using the PLDA parameters.

2. The pattern recognition apparatus according to claim 1, wherein the PLDA parameters are estimated from the features of the first domain data, and using the estimated PLDA parameters the transformation parameters are estimated from the second domain data so that the PLDA and transformation parameters maximize/minimize the objective function.

3. The pattern recognition apparatus according to claim 1, wherein the features of multiple test data are classified whether each of the multiple test data belongs to the same class as the enrollment data, and the most similar test data to the enrollment data is selected.

4. The pattern recognition apparatus according to claim 1, wherein the at least one processor is configured to cluster one of the first domain data and the second domain data so that each pair of the data from the same class is assigned to the same cluster and that each pair of the data from different classes is assigned to different clusters; and the PLDA parameters and the transformation parameters are estimated using the information of the clusters.

5. The pattern recognition apparatus according to claim 1, wherein the objective function is at least one of the likelihood, the a posteriori probability, the Bayesian probability of the PLDA and transformation parameters.

6. The pattern recognition apparatus according to claim 5, wherein the PLDA parameters and the transformation parameters are iteratively updated in accordance with an auxiliary function derived from the objective function.

7. A pattern recognition method using domain adaptation comprising:
estimating PLDA (Probabilistic Linear Discriminant Analysis) parameters and transformation parameters from features of a first domain data and a second domain data so as to maximize/minimize an objective function with respect to the features;
transforming features of enrollment and test data observed in one of the domains to the other domain using the transformation parameters; and
classifying whether the test data belongs to the same class as the enrollment data using the PLDA parameters.

8. A non-transitory computer readable recording medium in which pattern recognition program using domain adaptation is recorded, the pattern recognition program causing a computer to execute:
an estimation processing for estimating PLDA (Probabilistic Linear Discriminant Analysis) parameters and transformation parameters from features of a first domain data and a second domain data so as to maximize/minimize an objective function with respect to the features;
a transformation processing for transforming features of enrollment and test data observed in one of the domains to the other domain using the transformation parameters; and
a classification processing which classifies whether the test data belongs to the same class as the enrollment data using the PLDA parameters.

* * * * *

UNITED STATES PATENT AND TRADEMARK OFFICE
CERTIFICATE OF CORRECTION

PATENT NO. : 10,614,343 B2
APPLICATION NO. : 15/759302
DATED : April 7, 2020
INVENTOR(S) : Qiongqiong Wang and Takafumi Koshinaka It is certified that error appears in the above-identified patent and that said Letters Patent is hereby corrected as shown below:

In the Specification

Column 6, Description of Embodiments, Line 58; Delete "$\tilde{x}_{ij}^{(T)}$" and insert -- $x_{ij}^{(T)}$ -- therefor Column 11, Description of Embodiments, Line 25; Delete "$\acute{x}_{ij}^{(T)}$" and insert -- $\tilde{x}_{ij}^{(T)}$ -- therefor Signed and Sealed this
Twenty-first Day of July, 2020

Andrei Iancu
*Director of the United States Patent and Trademark Office*